(12) United States Patent
Zhang et al.

(10) Patent No.: US 8,989,381 B2
(45) Date of Patent: Mar. 24, 2015

(54) METHOD, APPARATUS, AND SYSTEM FOR DATA PROTECTION ON INTERFACE IN COMMUNICATIONS SYSTEM

(71) Applicant: Huawei Technologies Co., Ltd., Shenzhen, Guangdong (CN)

(72) Inventors: Dongmei Zhang, Beijing (CN); Jing Chen, Shanghai (CN); Lijia Zhang, Beijing (CN); Zhuo Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 13/871,900

(22) Filed: Apr. 26, 2013

(65) Prior Publication Data
US 2013/0236016 A1    Sep. 12, 2013

Related U.S. Application Data

(63) Continuation of application No. PCT/CH2012/070183, filed on Jan. 10, 2012.

(30) Foreign Application Priority Data

Jan. 10, 2011   (CN) .......................... 2011 1 0004183

(51) Int. Cl.
  *H04K 1/00*   (2006.01)
  *H04W 12/08*   (2009.01)
  (Continued)

(52) U.S. Cl.
  CPC .............. *H04W 12/08* (2013.01); *H04W 12/02* (2013.01); *H04W 12/10* (2013.01); *H04L 63/205* (2013.01); *H04W 84/047* (2013.01); *H04W 92/20* (2013.01)
  USPC .............. 380/270; 726/1; 370/315; 370/242; 370/328; 455/410

(58) Field of Classification Search
  USPC ................ 380/270; 726/1; 370/328, 336, 329
  See application file for complete search history.

(56) References Cited

U.S. PATENT DOCUMENTS

2007/0140491 A1   6/2007   Yi
2010/0100789 A1*   4/2010   Yu et al. ..................... 714/752
(Continued)

FOREIGN PATENT DOCUMENTS

CN   101094065   12/2007
CN   101242630   8/2008
(Continued)

OTHER PUBLICATIONS

Ericsson, ST-Ericsson, *Discussion of Un radio protocol support for S1-AP*, 3GPP TSG RAN WG2 #68bis, R2-100430, Valencia, Spain, Jan. 18-22, 2010, pp. 1-3.
(Continued)

*Primary Examiner* — Beemnet Dada
*Assistant Examiner* — Sayed Beheshti Shirazi
(74) *Attorney, Agent, or Firm* — Staas & Halsey LLP

(57) ABSTRACT

A method and an apparatus for protecting data carried on an Un interface between a eNB and a relay node are disclosed. Three types of radio bearers (RBs) are defined over the Un interface: signaling radio bearers (SRBs) for carrying control plane signaling data, signaling-data radio bearers (s-DRBs) for carrying control plane signaling date; and data-data radio bearers (d-DRBs) for carrying user plane data. An integrity protection algorithm and an encryption algorithm are negotiated for control plane signaling data on an SRB, control plane signaling data carried on an s-DRB, and user plane data carried on a d-DRB. With the respective integrity protection algorithm and encryption algorithm, the data over the Un interface can be protected respectively. Therefore, the security protection on the Un interface is more comprehensive, and the security protection requirements of data borne over different RBs can be met.

20 Claims, 7 Drawing Sheets

(51) Int. Cl.
*H04W 12/02* (2009.01)
*H04W 12/10* (2009.01)
*H04L 29/06* (2006.01)
*H04W 84/04* (2009.01)
*H04W 92/20* (2009.01)

(56) References Cited

U.S. PATENT DOCUMENTS

| | | | |
|---|---|---|---|
| 2010/0260096 A1* | 10/2010 | Ulupinar et al. | 370/315 |
| 2010/0272007 A1 | 10/2010 | Shen et al. | |
| 2010/0293595 A1* | 11/2010 | Naslund et al. | 726/1 |
| 2010/0309837 A1 | 12/2010 | Yi et al. | |
| 2010/0322148 A1* | 12/2010 | Liu et al. | 370/315 |
| 2012/0039472 A1* | 2/2012 | Liu et al. | 380/270 |
| 2012/0066737 A1* | 3/2012 | Zhang et al. | 726/1 |
| 2012/0093070 A1* | 4/2012 | Huang et al. | 370/315 |
| 2012/0099441 A1* | 4/2012 | Jung et al. | 370/242 |
| 2013/0034059 A1* | 2/2013 | Lee et al. | 370/328 |
| 2013/0210384 A1* | 8/2013 | Zhang | 455/410 |

FOREIGN PATENT DOCUMENTS

| | | |
|---|---|---|
| EP | 2034658 | 11/2009 |
| EP | 2416521 A1 | 2/2012 |
| WO | WO2008/095428 | 8/2008 |
| WO | 2010/111964 A1 | 10/2010 |

OTHER PUBLICATIONS

3rd Generation Partnership Project; Technical Specification Group Services and System Aspects; 3GPP System Architecture Evolution (*SAE*); Security architecture (Release 9), 3GPP TS 33.401 V9.6.0 (Dec. 2012), pp. 1-105.
Rejection Decision, dated Jun. 5, 2013, , in corresponding Chinese Application No. 201110004183.0 (18 pp.).
Extended European Search Report dated Dec. 18, 2013 in corresponding International Patent Application No. PCT/CN2012070183.
"S1-AP transmission in Un interface", LG Electronics Inc., R2-101165, 3GPP TSG-RAN2 Meeting #69, San Francisco, USA, Feb. 2010, pp. 1-3.
"Integrity protection of DRBs over Un interface", Samsung, R2-106589, 3GPP TSG-RAN WG2 #72, Jacksonville, USA, Nov. 2010, pp. 1-3.
"RRC Impact due to S1/X2 IP", Nokia Siemens Networks, Nokia Corporation, R2-106230, 3GPP TSG-RAN WG2 Meeting #72, Jacksonville, USA, Nov. 2010, 14 pp.
Notice of Reasons for Rejection, dated Mar. 4, 2014, in corresponding Japanese Application No. 2013-535275 (4 pp.).
Ericsson, ST-Ericsson, *Discussion of Un radio protocol support for S1-AP*, 3GPP TSG-RAN WG2 #68bis, R2-100430, Valencia, Spain, Jan. 18-22, 2010, pp. 1-3.
Huawei, HiSilicon, *Consideration of data protection on Un interface*, 3GPP TSG-SA3 (Security), S3-110079, SA3#62, Jan. 24-28, 2011 (5 pp.).
Ericsson, ST-Ericsson, *Security of Un interface*, 3GPP TSG SA WG3 Security—S2#59, S3-100501, Lisbon, Portugal, Apr. 26-30, 2010, pp. 1-4.
3rd Generation Partnership Project; Technical Specification Group Services and System Aspects; 3GPP System Architecture Evolution (*SAE*); Security architecture (Release 9), 3GPP TS 33.401 V9.6.0 (Dec. 2012), pp. 1-105.
*Change Request* 33.401 CR 0437, rev 1, 3GPP TSG-SA3 (Security), S3-10177, SA3#62, Jan. 24-28, 2011, 1, Ljubljana, Slovenia (11 pp.).
3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331 V10.0.0 (Dec. 2010), pp. 1-276.
*Change Request*, 36.331 CR 559, 3GPP TSG-RAN WG2 Meeting #73, R2-110825, Taipei, Taiwan, Feb. 21-25, 2011, pp. 1-12.
International Search Report, dated Apr. 12, 2012, in corresponding International Application No. PCT/CN2012/070183 (3 pp.).
Written Opinion of the International Searching Authority, dated Apr. 19, 2012, in corresponding International Application No. PCT/CN2012/070183 (15 pp.).
Search Report, dated Dec. 27, 2012, in corresponding Chinese Application No. 201110004183.0 (10 pp.).
Search Report, dated Jan. 24, 2013, in corresponding Chinese Application No. 201110004183.0 (10 pp.).
First Office Action, dated Feb. 4, 2013, in corresponding Chinese Application No. 201110004183.0 (16 pp.).
Rejection Decision, dated Jun. 5, 2013, in corresponding Chinese Application No. 201110004183.0 (18 pp.).

\* cited by examiner

METHOD, APPARATUS, AND SYSTEM FOR DATA PROTECTION ON INTERFACE IN COMMUNICATIONS SYSTEM

CROSS-REFERENCE TO RELATED APPLICATIONS

This application is a continuation of an International Application No. PCT/CN2012/070183, filed on Jan. 10, 2012, which claims priority to Chinese Patent Application No. 201110004183.0, filed on Jan. 10, 2011. Both of the aforementioned patent applications are hereby incorporated by reference in their entireties.

TECHNICAL FILED

The present invention relates to the field of telecommunications, and in particular to a method, an apparatus, and system for data protection on an Un interface.

BACKGROUND

In the existing long term evolution (LTE) system, the air interface exists only between an evolved NodeB (eNB) and user equipment (UE). There are two types of data over this air interface: radio resource control (RRC) signaling (control plane data) on a signaling radio bearer (SRB); and user plane data on a data radio bearer (DRB). Integrity protection and encryption protection can be provided for the RRC control plane data, and only encryption protection is provided for the user plane data. When selecting encryption algorithms, only a same encryption algorithm can be selected for the control plan data and the user plane data.

FIG. 1 shows an access stratum (AS) security algorithm negotiation procedure in the existing LTE system. As shown in FIG. 1, the eNB on a network side selects, based on the UE's security capabilities and an algorithm priority list on the network side, an integrity protection algorithm and an encryption algorithm, and notifies the UE of the selected algorithms. The MAC-I indicates an integrity message authentication code.

A new access network node, relay node (RN), is introduced to the LTE-A system. The RN plays two roles: a UE role and an eNB role. The RN accesses the network like a legacy UE. The RN then establishes an S1/X2 interface with a doner eNB (DeNB) to switch to the eNB role.

FIG. 2 shows a schematic architecture of an evolved universal mobile telecommunication system (UMTS) territorial radio access network (E-UTRAN) after the RN is introduced. With the introduction of the RN, the air interface between the UE and the eNB is divided into two segments. One is the air interface between the RN and the UE, which is called as a Uu interface. The other is between the RN and the DeNB, which is called as an Un interface. All data transmitted on the Un interface is mapped to the following two types of RBs for transmission:

1. SRB: for carrying the RRC signaling between the RN and the DeNB.
2. DRB: for carrying S1/X2-AP signaling and S1/X2-UP data.

As such, in addition to the legacy RRC signaling and user data, data transmitted on the Un interface also includes another type of data, that is, the S1/X2-AP signaling (control signaling) carried on the DRB. Furthermore, the user plane data on the Un interface may need to be integrity protected. Therefore, new security requirements are needed on the Un interface. The conventional LTE security mechanism may not meet the new security requirements for the user plane data over the Un interface. In addition, the RN system introduces a security demand in which the protection is based on the granularity of per RB. The legacy security mechanism, however, cannot provide security protection with such fine granularity.

SUMMARY

Embodiments of the present invention provide a method and apparatus for data protection on an Un interface to address new security requirements due to the introduction of an RN.

According to an aspect of the present invention, a method for protecting data on an Un interface is provided. The method includes: negotiating an integrity protection algorithm and an encryption algorithm for signaling data on a SRB over the Un interface, signaling data on a s-DRB over the Un interface, and user data on a d-DRB over the Un interface, respectively; and implementing security protection for the signaling data on the SRB, the signaling data on the s-DRB, and the user data on the d-DRB with the corresponding negotiated integrity protection algorithms and encryption algorithms.

According to another aspect of the present invention, an apparatus for protecting data on an Un interface is provided. The apparatus includes: a negotiating unit, configured to select an integrity protection algorithm and an encryption algorithm for signaling data on a SRB over the Un interface, signaling data on a s-DRB over the Un interface, and user data on a d-DRB on the Un interface, respectively; and a protecting unit, configured to implement security protection for the signaling data on the SRB, the signaling on the DRBs, and the user data on the d-DRB with the negotiated respective integrity protection algorithm and encryption algorithm.

With the method and apparatus according to the embodiments, the data carried on the three types of RBs is security protected with the respective integrity protection algorithm and encryption algorithm. Therefore, data security protection on the Un interface is more comprehensive, and the security protection requirements of data borne over different RBs can be met.

BRIEF DESCRIPTION OF DRAWINGS

Accompanying drawings described herein are provided to better illustrate the technical solutions in the embodiments of the present invention. The accompanying drawings are a part of the application, but are not intended to limit the scope of the present invention. A person skilled in the art may derive other drawings from these accompanying drawings without creative efforts. In the accompanying drawings.

DESCRIPTION OF EMBODIMENTS

Embodiments of the present invention provide a method, and apparatus, and system for protecting data on an Un interface to implement security protection for data on each type of RB/each RB over the Un interface.

S1/X2-AP signaling data and S1/X2-UP user data are mapped to DRBs over the Un interface. The security requirements for the DRBs carrying the S1/X2-AP signaling data and that for the DRBs carrying the S1/X2-UP user data are different. For convenience of description, in the embodiments, DRBs are divided into two types: signaling-DRBs (s-DRBs) and data-DRBs (d-DRBs). The s-DRBs represent those DRBs that carry the S1/X2-AP signaling data. The d-DRBs represent those DRBs that carry the S1/X2-UP user data. Thus, there are three types of RBs over the Un interface: the SRB, the s-DRB, and the d-DRB.

Like in an LTE, integrity protection is mandatory and encryption protection is optional for the RRC signaling on the Un interface in LTE-A. For the Un interface in the LTE-A system, integrity protection is mandatory for S1/X2-AP and is optional for S1/X2-UP. As a UE key or a UE handover key may be transmitted on the S1/X2-AP, encryption protection is mandatory for the S1/X2-AP. Encryption protection is optional for the S1/X2-UP.

In order to make the objectives, technical solutions, and advantages of the present invention more comprehensible, different embodiments of the present invention are further described in detail below with reference to the accompanying drawings. It should be noted that these embodiments described herein are merely a part rather than all of the embodiments of the present invention. All other embodiments obtained by a person skilled in the art based on these embodiments without creative effects shall fall within the protection scope of the present invention.

Embodiment 1

This embodiment provides a method for protecting data on an Un interface.

Figure 1:
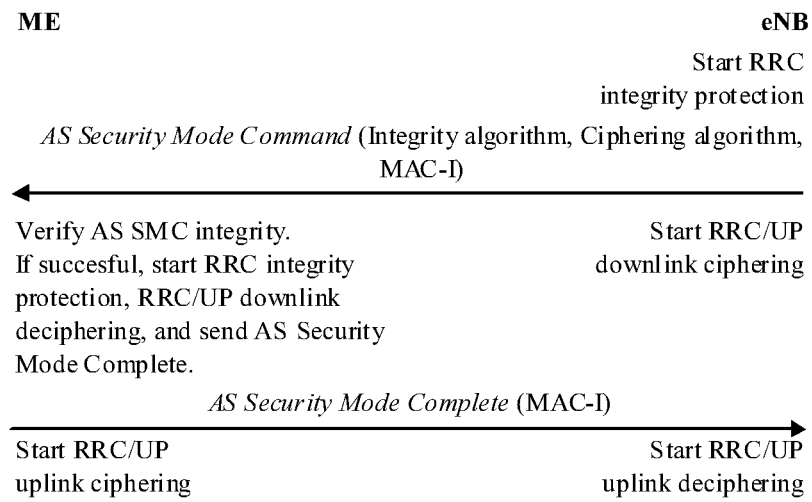
FIG. 1 is a schematic diagram of an algorithm negotiation procedure in an LTE system according to the prior art.
Figure 2:
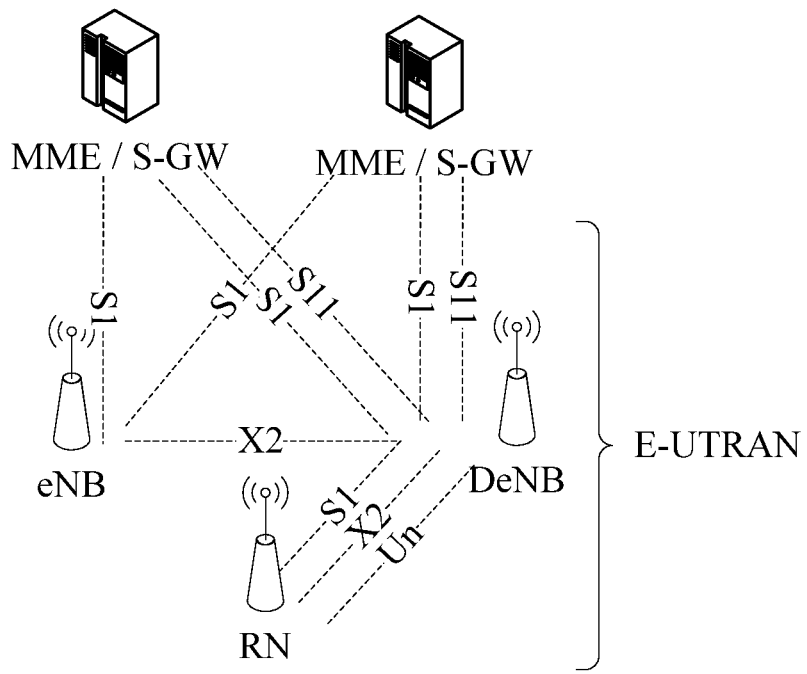
FIG. 2 is a schematic diagram of the architecture of a conventional E-UTRAN after an RN is introduced.
Figure 3:
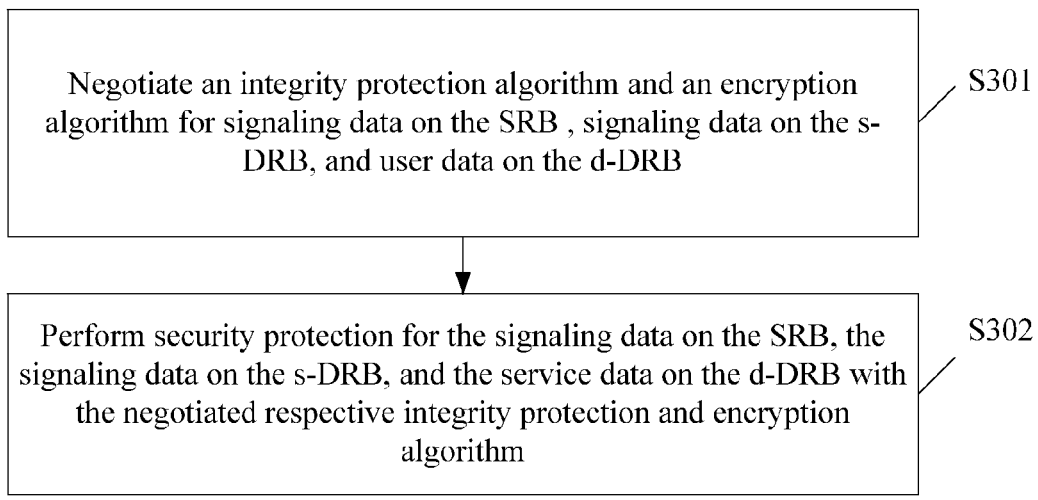
FIG. 3 is an overall flowchart of a method according to an embodiment of the present invention.

FIG. 3 is an overall flowchart of the method according to the embodiment. As shown in FIG. 3, the method includes the following:

S301: Negotiate an integrity protection algorithm and an encryption algorithm for signaling data on a SRB over the Un interface, for signaling data on a s-DRB over the Un interface, and for user data on a d-DRB over the Un interface, respectively.

S302: Implement security protection for the signaling data on the SRB, the signaling data on the s-DRB, and the user data on the d-DRB with the negotiated integrity protection algorithms and ciphering algorithms.

Alternatively, according to data granularity of security protection, step S301 may include the following two situations. One is that the algorithm negotiate is based on per type of RB. That is, negotiating an integrity protection algorithm and an encryption algorithm for each type of the SRB, the s-DRB and the d-DRB. The other one is that the algorithm negotiation is based on per RB. That is, negotiate integrity protection and encryption algorithms for each RB on the Un interface.

Alternatively, step S302 includes: pre-storing a integrity protection algorithm distinguisher and an encryption algorithm distinguisher for the SRB, the s-DRB, and the d-DRB, respectively; generating integrity keys for the SRB, the s-DRB, and the d-DRB according to their respective integrity protection algorithm and integrity protection algorithm distinguisher; generating encryption keys for the SRB, the s-DRB, and the d-DRB according to their respective encryption algorithms and encryption algorithm distinguishers; and performing security protection for the data on the SRB, the s-DRB, and the d-DRB with their respective integrity key and encryption key.

Alternatively, if there is a same algorithm among the integrity protection algorithms corresponding to the SRB, the s-DRB, and the d-DRB, store different integrity protection algorithm distinguishers for the types of RBs with the same integrity protection algorithm. If there is a same encryption algorithm among the encryption algorithms corresponding to the SRB, the s-DRB, and the d-DRB, store different encryption algorithm distinguishers for the types of RBs with the same encryption algorithm.

The method according to this embodiment may have different implementation ways for different application scenarios.

Scenario 1:

In this scenario, a same integrity protection algorithm and a same encryption algorithm are negotiated for the signaling data on the SRB, the signaling data on the s-DRB, and the user data on the d-DRB. Alternatively, this scenario further indicates whether security protection is activated for the user data on the d-DRB.

Alternatively in scenario 1, the same integrity protection algorithm and same encryption algorithm selected for the data on the SRB, the s-DRB, and the d-DRB over the Un interface may be carried in an access stratum security mode command (AS SMC).

Alternatively in scenario 1, whether the security protection for the user data on the d-DRB is activated may be indicated in a radio resource configuration dedicated information element or an AS SMC.

Alternatively, the indication includes: integrity protection and encryption protection are activated, only integrity protection is activated, only encryption protection is activated, or neither integrity protection nor encryption protection is activated.

The following describes the data protection methods used in scenario 1 by way of examples.

1. Pre-Stored Algorithm Lists

Figure 4:
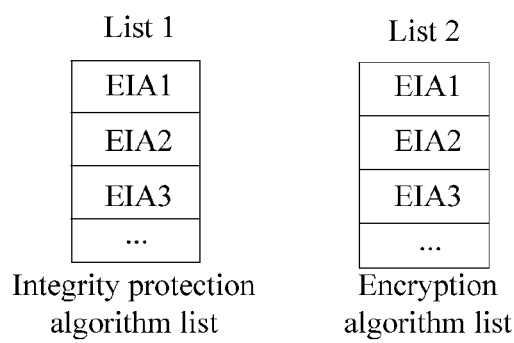
FIG. 4 is a schematic diagram of pre-stored algorithms lists according to an embodiment of the present invention.

FIG. 4 shows the pre-stored algorithm lists. These lists are used for the DeNB to negotiate with the RN the algorithms used on the Un interface. Alternatively, the algorithms in the lists are ordered according to priority. If an operator permits that different algorithms can be used for the three types of RB data over the Un interface, a set of algorithm priority lists needs to be pre-configured in the DeNB for each type of RB. Alternatively, if according to configuration, a certain RB or a certain type of RB does not need to be security protected protection, a packet data convergence protocol (PDCP) protocol stack of the DeNB may directly skip security protection during processing.

2. Security Protection Indication

Each type of RBs has different protection requirements. The security protection mechanism for a certain type of RBs may be configured through a RRC signaling during the establishment of the RB, according to the operator's policy. For example, when a current RB is established, parameters related to the RB are configured through an RRCConnection-Reconfiguration message. The existing RRCConnectionReconfiguration message includes a radioResourceConfigDedicated IE. In order to flexibly configure whether the security protection for each type of RB is activated, an indication IE, e.g., security indicator, may be added to the exiting radioResourceConfigDedicated IE to indicate whether the RB needs to be encryption protected and integrity protected.

A possible way is as follows: the security indicator IE is configured with only 2 bits, which are used to indicate whether to activate encryption and integrity protection, respectively. If a bit is set to 0, it indicates that the corresponding protection is disabled. If the bit is set to 1, it indicates that the corresponding protection is activated. Table 1 describes the meaning of the IE.

TABLE 1

Example of the meaning of each value of the new IE

| Security indicator | Meaning |
| --- | --- |
| 00 | Neither encryption protection nor integrity protection is activated. |
| 01 | Integrity protection is activated, encryption protection is disabled. |
| 10 | Encryption protection is activated, but integrity protection is disabled. |
| 11 | Encryption protection and integrity protection are activated. |

The selected security algorithms are notified to the RN by using other ways. One possible way is that the algorithms are negotiated through an AS SMC procedure. Thus, the selected security algorithms may be indicated to the RN in the AS SMC procedure. The selected algorithms may also be indicated to the RN in an RRCConnectionReconfiguration message. Whether each type of RBs needs security protection may be indicated to the RN in the AS SMC procedure or through the RRCConnectionReconfiguration message.

After information that whether security protection for each RB is activated is synchronized between the DeNB and RN, the security protection method is considered for each type of RB that needs security protection.

3. Method for Protecting Data on a RB

There are 3 types of RBs over the Un interface. The algorithms for each type of RBs may be independent from one another. Two of the three types of RBs may be protected with the same algorithms. The three types of RBs may use a same set of security algorithm. This scenario considers the situation that the three types of RBs the same set of integrity protection algorithm and encryption algorithm over the Un interface. That is, a same integrity protection algorithm and a same encryption algorithm is negotiated for the signaling data on the SRB, the signaling data on the s-DRB, and the user data on the d-DRB. Algorithm negotiation in this scenario may further be divided into the following two situations, that is, 3.1) and 3.2).

3.1) For each type of RBs that need to be protected, a same encryption algorithm and a same integrity protection algorithm may be selected. The selection of the algorithms may be negotiated through an AS SMC. In this case, the AS SMC does not need to be extended.

If security protection is activated, the selected same set of encryption and integrity protection algorithms is used for the SRB, the s-DRB, the d-DRB. Information about whether each d-DRB needs security protection is indicated through other ways. For example, one way is as follows: a securityindicator IE is added in a radio resource configuration dedicated IE (RadioResourceConfigDedicated IE) to indicate whether the security protection for the d-DRB is activated. As the added securityindicator IE is shown below by the underlying part in the radio resource configuration dedicated IE:

RadioResourceConfigDedicated IE

```
-- ASN1START
RadioResourceConfigDedicated ::=    SEQUENCE {
    srb-ToAddModList        SRB-ToAddModList        OPTIONAL,    -- Cond HO-Conn
    drb-ToAddModList        DRB-ToAddModList        OPTIONAL,    -- Cond HO-toEUTRA
    drb-ToReleaseList    DRB-ToReleaseList        OPTIONAL,    -- Need ON
    mac-MainConfig                CHOICE {
        explicitValue            MAC-MainConfig,
        defaultValue            NULL
    }    OPTIONAL,                                -- Cond HO-toEUTRA2
    sps-Config        SPS-Config            OPTIONAL,    -- Need ON
    physicalConfigDedicated        PhysicalConfigDedicated    OPTIONAL;    -- Need ON
    ...,
    [[    rlf-TimersAndConstants-r9    RLF-TimersAndConstants-r9    OPTIONAL -- Need ON
    ]]
}
SRB-ToAddModList ::=        SEQUENCE (SIZE 1..2)) OF SRB-ToAddMod
SRB-ToAddMod ::= SEQUENCE {
    srb-Identity            INTEGER (1..2),
    rlc-Config            CHOICE {
        explicitValue            RLC-Config,
        defaultValue            NULL
    }                OPTIONAL,                --
    Cond Setup
        logicalChannelConfig        CHOICE {
```

```
        explicitValue          LogicalChannelConfig,
        defaultValue           NULL
    }              OPTIONAL,                                    --
Cond Setup
    ...
}
DRB-ToAddModList ::=          SEQUENCE (SIZE (1..maxDRB)) OF DRB-ToAddMod
DRB-ToAddMod ::= SEQUENCE {
    eps-BearerIdentity    INTEGER (0..15)       OPTIONAL,      -- Cond DRB-Setup
    drb-Identity          DRB-Identity,
    pdcp-Config           PDCP-Config           OPTIONAL,      -- Cond PDCP
    rlc-Config            RLC-Config            OPTIONAL,      -- Cond Setup
    logicalChannelIdentity INTEGER (3..10)      OPTIONAL,      -- Cond DRB-Setup
    logicalChannelConfig  LogicalChannelConfig OPTIONAL,       -- Cond Setup
    securityindicator     INTEGER(0..3)         OPTIONAL,
    ...
}
DRB-ToReleaseList ::=         SEQUENCE (SIZE (1..maxDRB)) OF DRB-Identity
-- ASN1STOP
```

The securityindicator IE may also be added to a lower-level PDCP configuration IE of the radio resource configuration dedicated IE, as shown by the underlying part of the PDCP configuration IE:

PDCP-Config IE (PDCP Configuration IE)

```
-- ASN1START
PDCP-Config ::=           SEQUENCE {
    discardTimer          ENUMERATED {
                              ms50, ms100, ms150, ms300, ms500,
                              ms750, ms1500, infinity
    }                                          OPTIONAL,     -- Cond
Setup
    rlc-AM                SEQUENCE {
        statusReportRequired  BOOLEAN
    }                                          OPTIONAL,     -- Cond
Rlc-AM
    rlc-UM                SEQUENCE {
        pdcp-SN-Size      ENUMERATED {len7bits, len12bits}
    }                                          OPTIONAL,     -- Cond
Rlc-UM
    headerCompression     CHOICE {
        notUsed               NULL,
        rohc                  SEQUENCE {
            maxCID            INTEGER {1..16383}       DEFAULT 15,
            profiles          SEQUENCE {
                profile0x0001     BOOLEAN,
                profile0x0002     BOOLEAN,
                profile0x0003     BOOLEAN,
                profile0x0004     BOOLEAN,
                profile0x0006     BOOLEAN,
                profile0x0101     BOOLEAN,
                profile0x0102     BOOLEAN,
                profile0x0103     BOOLEAN,
                profile0x0104     BOOLEAN
            },
            ...
        }
    },
    ...
    securityindicator     INTEGER(0..3)        OPTIONAL,
}
-- ASN1STOP
```

If security protection is activated, algorithms negotiated in the AS SMC are applied to the data on the RB.

Figure 5:
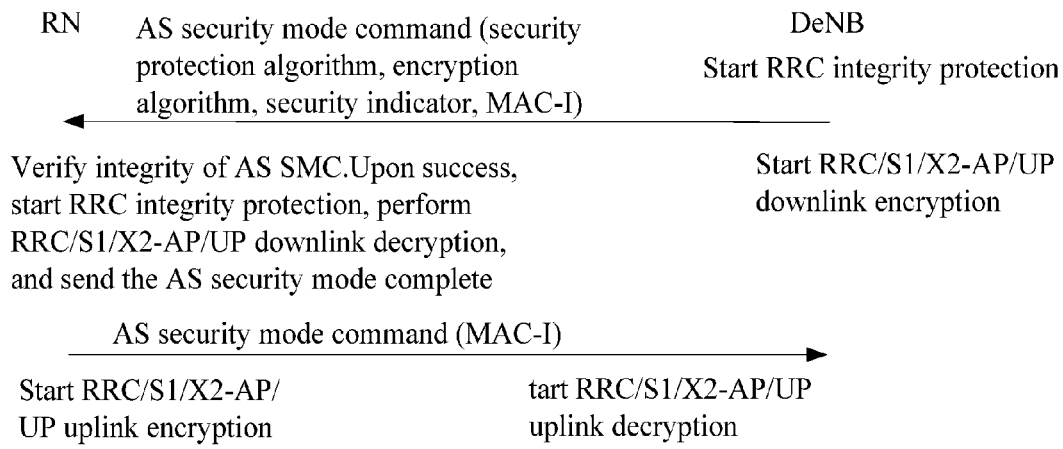
FIG. 5 is a first schematic diagram of algorithm negotiation by using an AS SMC according to an embodiment of the present invention.

3.2) The data on the SRB, on the s-DRB, and on the d-DRB use a same encryption algorithm and a same integrity protection algorithm. The selection of the algorithms is negotiated through an AS SMC procedure. In addition, as shown in FIG. 5, in this situation, the AS SMC is extended by adding an Indicator (security indicator) to indicate whether the d-DRB needs to be integrity protected. The two algorithms in the SMC message are applicable to the three types of RB. If the Indicator indicates that the d-DRB needs security protection, the integrity protection algorithm in the AS SMC message is also applied to the d-DRB.

Further, after the integrity protection algorithm and encryption algorithm are determined, corresponding keys are needed to generate final keys. Even the SRB, the s-DRB, and the d-DRB use the same algorithm, there are two possibilities for the keys of each type of RB. The two possibilities are as follows.

I) Keys may be mutually independent. That is, each type of RB has its own encryption key and integrity protection key, as follows:

SRB: integrity protection key is represented as Krrc_int, and the encryption key is represented as Krrc_enc.

s-DRB: integrity protection key is represented as Kups_int, and the encryption key is represented as Kups_enc.

d-DRB: integrity protection key is represented as Kupd_int, and the encryption key is represented as Kupd_enc.

A key derivation method (which is the same as the derivation method in TS 33.401) is as follows:

KAS=KDF (KeNB, alg. ID, alg. distinguisher); where, KDF is a key derivation function.

As the SRB, the s-DRB, and the d-DRB use the same set of encryption and integrity protection algorithms, the algorithm identity (alg. ID) for each of the SRB, s-DRB, and d-DRB is the same. In order to obtain different encryption and integrity keys for the SRB, the s-DRB, and the d-DRB, the existing algorithm distinguishers are extended as follows:

TABLE 2

Extension of Algorithm distinguishers

| Algorithm distinguisher | Value |
|---|---|
| NAS-enc-alg | 0x01 |
| NAS-int-alg | 0x02 |
| RRC-enc-alg | 0x03 |
| RRC-int-alg | 0x04 |
| UPs-enc-alg | 0x05 |
| UPs-int-alg | 0x06 |
| UPd-enc-alg | 0x07 |
| UPd-int-alg | 0x08 |

The underlying parts in above table 2 are the extended algorithm distinguishers that are introduced to obtain independent keys for the three types of RBs. UPs-enc-alg represents the algorithm distinguisher for calculating the Kups_enc key. UPs-int-alg represents the algorithm distinguisher for calculating Kups_int key. UPd-enc-alg represents the algorithm distinguisher for obtaining Kupd_enc key, and UPd-int-alg represents the algorithm distinguisher for calculating the Kupd_int key.

II) Among the three types of RBs, the s-DRB may use a same protection mechanism as the SRB. That is, the encryption and integrity protection keys for the s-SRB are same as that for the SRB (Kups_int=Krrc_int; Kups_enc=Krrc_enc). The data on the s-DRB may also be treated in the same way as that on the d-DRB, and use the same encryption and integrity protection keys as the d-DRB (Kups_int=Kupd_int; Kups_enc=Kupd_enc). In these two situations, the data on the Un interface only need to be distinguished as two types. As such, the extended algorithm distinguishers may be as follows:

TABLE 3

Extension of algorithm distinguishers

| Algorithm distinguisher | Value |
|---|---|
| NAS-enc-alg | 0x01 |
| NAS-int-alg | 0x02 |
| RRC-enc-alg | 0x03 |
| RRC-int-alg | 0x04 |
| UP-enc-alg | 0x05 |
| UP-int-alg | 0x06 |

Compared with the legacy LTE keys, just integrity protection requirements for the DRB are added on the Un interface. Thus, only another integrity protection key for user plane needs to be derived. Therefore, only one algorithm distinguisher, UP-int-alg, is to be extended.

Scenario 2:

For each type of RBs that needs to be protected, as the data on the s-DRB is S1/X2 control plane signaling, the integrity protection for the data on the s-DRB may be the same as that for the SRB. That is, the integrity protection algorithm for the SRB is also applied for the s-DRB. While the d-DRB uses its independent integrity protection algorithm and integrity key. As encryption is optional for the SRB and the d-DRB, the SRB and the d-DRB may use a same encryption algorithm. The s-DRB may use an independent encryption algorithm.

Specifically in this scenario, For the Un interface, a same integrity protection algorithm 1 is negotiated for the data on the SRB and the data on the s-DRB. An integrity protection algorithm 2 is negotiated for the data on the d-DRB. A same encryption algorithm 1 is negotiated for the data on the SRB and the data on the d-DRB, and an encryption algorithm 2 is negotiated for the data on the s-DRB.

Alternatively in this scenario, it may indicate whether integrity protection is applied for the data on the d-DRB. It may also indicate whether the encryption protection is applied for the data on the SRB and d-DRB.

As an example, integrity protection algorithm 1, integrity protection algorithm 2, encryption algorithm 1, and encryption algorithm 2 are carried in an AS SMC. The value of integrity protection algorithm 2 may set to a specific value to disable integrity protection for the d-DRB. The value of encryption algorithm 1 may set to a specific value to disable the encryption protection for the SRB and the d-DRB.

The following describes the data protection method used in scenario 2 by way of example.

In this scenario, the algorithm negotiation for the SRB, the s-DRB, the d-DRB may be implemented through an AS SMC procedure. Two algorithm IEs are added to the existing security mode command (SMC) so that the encryption and integrity algorithms selected for the SRB, the s-DRB, and the d-DRB can be indicated.

Figure 6:
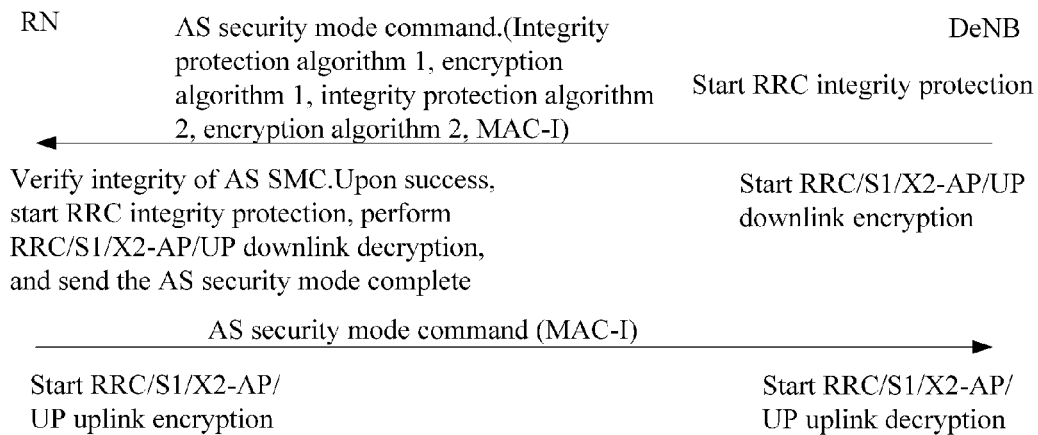
FIG. 6 is a second schematic diagram of algorithm negotiation by using an AS SMC according to an embodiment of the present invention.

As shown in FIG. 6, integrity protection algorithm 1 indicates the integrity protection algorithm for the SRB and the s-DRB, and integrity protection algorithm 2 indicates the integrity protection algorithm for the d-DRB. If the d-DRB does not need to be integrity protected, the value of integrity protection algorithm 2 may be set to an invalid value (for example, all 1s), or set to an indication that the integrity protection is not activated. Encryption algorithm 1 indicates the encryption algorithm selected for the DRBs. Encryption algorithm 2 indicates the encryption algorithm for the SRB and the d-DRB. If the SRB and the d-DRB do not need be encrypted, the value of encryption algorithm 2 may be set to an invalid value (for example, all 1s), or set to an indication indicating that encryption protection is disabled.

Upon the algorithm for each type of RB being negotiated with the above methods, the integrity protection keys and encryption keys for each type of RB are to be calculated.

For the s-DRB and the SRB that use the same integrity protection algorithm, the keys for the S-DRB and the SRB may be as follows:

I) The integrity protection keys for these two types of RBs are independent with each other.

KAS=KDF (KeNB, alg. ID, alg. distinguisher).

An integrity protection algorithm distinguisher UP-int-alg is introduced so that the integrity protection key generated for the s-DRB can be distinguished from that for the SRB. The extended algorithm distinguisher is shown in the following table 4:

TABLE 4

Extension of algorithm distinguishers

| Algorithm distinguisher | Value |
|---|---|
| NAS-enc-alg | 0x01 |
| NAS-int-alg | 0x02 |
| RRC-enc-alg | 0x03 |
| RRC-int-alg | 0x04 |
| UP-enc-alg | 0x05 |
| UP-int-alg | 0x06 |

II) The two types of RBs use the same integrity key.
KAS=KDF (KeNB, alg. ID, alg. distinguisher);
In this situation, the existing algorithm distinguisher list does not need to be extended.

For the situation where the S-DRB and the SRB use the same encryption algorithm, the encryption keys for the S-DRB and the SRB may be as follows:

I) The encryption keys for these two types of RBs are independent from each other. In this case, the conventional algorithm distinguisher list can be used to distinguish the two keys, and does not need to be extended.

II) The situation that the encryption keys for these two types of RBs are the same is not considered in this scenario.

Scenario 3:

As integrity protection and encryption algorithms are needed for the SRB and the s-DRB, the algorithms for these two types of RBs may be negotiated with a legacy algorithm negotiation method, that is, through an AS SMC. Integrity protection for the d-DRB may be configured per DRB. Therefore, configuration related to integrity protection and encryption for the d-DRB may be indicated in a lower-level IE of a RadioResourceConfigDedicated IE when each DRB is established.

Specifically, in scenario 3, the same integrity protection and encryption algorithms selected for the data on the SRB and the s-DRB are carried in the AS SMC.

The integrity protection algorithm and/or encryption algorithm selected for the data on the d-DRB is carried in a radio resource configuration dedicated IE of a message during an RB establishment procedure (as shown in the underlying part of the radio resource configuration dedicated IE). In addition, if no algorithm is included in the radio resource configuration dedicated IE, it means that the security protection mechanism related to the algorithm is not activated.

RadioResourceConfigDedicated IE (radio resource configuration dedicated IE)

```
-- ASN1START
RadioResourceConfigDedicated ::=   SEQUENCE {
    srb-ToAddModList        SRB-ToAddModList        OPTIONAL,   -- Cond HO-Conn
    drb-ToAddModList        DRB-ToAddModList        OPTIONAL,   -- Cond HO-toEUTRA
    drb-ToReleaseList       DRB-ToReleaseList       OPTIONAL,   -- Need ON
    mac-MainConfig                                  CHOICE {
        explicitValue           MAC-MainConfig,
        defaultValue            NULL
    }           OPTIONAL,                                       -- Cond HO-toEUTRA2
    sps-Config              SPS-Config              OPTIONAL,   -- Need ON
    physicalConfigDedicated PhysicalConfigDedicated OPTIONAL,   -- Need ON
    ...,
    [[ rlf-TimersAndConstants-r9 RLF-TimersAndConstants-r9  OPTIONAL  -- Need ON
    ]]
}
SRB-ToAddModList ::=        SEQUENCE (SIZE (1..2)) OF SRB-ToAddMod
SRB-ToAddMod ::= SEQUENCE {
    srb-Identity            INTEGER (1..2),
    rlc-Config              CHOICE {
        explicitValue           RLC-Config,
        defaultValue            NULL
    }           OPTIONAL,                                       --
Cond Setup
    logicalChannelConfig    CHOICE {
        explicitValue           LogicalChannelConfig,
        defaultValue            NULL
    }           OPTIONAL,                                       --
Cond Setup
    ...
}
DRB-ToAddModList ::=        SEQUENCE (SIZE (1..maxDRB)) OF DRB-ToAddMod
DRB-ToAddMod ::= SEQUENCE {
    eps-BearerIdentity   INTEGER (0..15)         OPTIONAL,   -- Cond DRB-Setup
    drb-Identity         DRB-Identity,
    pdcp-Config          PDCP-Config             OPTIONAL,   -- Cond PDCP
    rlc-Config           RLC-Config              OPTIONAL,   -- Cond Setup
    logicalChannelIdentity INTEGER (3..10)       OPTIONAL,   -- Cond DRB-Setup
    logicalChannelConfig LogicalChannelConfig    OPTIONAL,   -- Cond Setup
    drb-int-alg          INT-ALG-Config                      OPTIONAL,
--CondDRB-Setup
    drb-enc-alg          INT-ALG-Config                      OPTIONAL,
--CondDRB-Setup
    ...
}
DRB-ToReleaseList ::=       SEQUENCE (SIZE (1..maxDRB)) OF DRB-Identity
-- ASN1STOP
```

After the algorithms are selected, the integrity protection keys and encryption keys for all types of RB are calculated:

I) The keys for the SRB and the s-DRB are independent with each other. The existing encryption algorithm distinguishers can be used to generate different encryption keys for the SRB and for the s-DRB. An integrity protection algorithm distinguisher is introduced as follows for the s-DRB:

TABLE 5

Extension of algorithm distinguishers

| Algorithm distinguisher | Value |
|---|---|
| NAS-enc-alg | 0x01 |
| NAS-int-alg | 0x02 |
| RRC-enc-alg | 0x03 |
| RRC-int-alg | 0x04 |
| UP-enc-alg | 0x05 |
| UP-int-alg | 0x06 |

II) The keys for the SRB and the s-DRB are the same.

Input parameters for generating the keys for the s-DRB may be the same as those for generating the keys for the SRB.

KAS=KDF (KeNB, alg. ID, alg. distinguisher).

Scenario 4:

For all RBs that need to be protected, an encryption algorithm and an integrity protection algorithm may be selected for each type of RBs, respectively. In this situation, the extension of the AS SMC may be as follows: three integrity protection algorithms and three encryption algorithms are carried in an SMC message. In addition, the mapping relationship between the sequence of the algorithms and each type of RBs need to be pre-configured. For example, the mapping relationship is: the algorithms for the SRB, the s-DRB, and the d-DRB are ranked in sequence.

Figure 7:
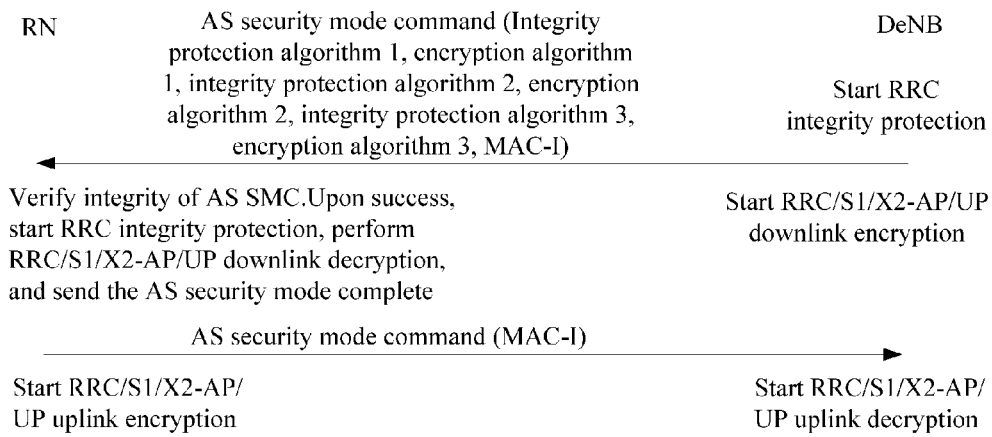
FIG. 7 is a third schematic diagram of algorithm negotiation by using an AS SMC according to an embodiment of the present invention.

Specifically, in scenario 4, as shown in FIG. 7, integrity protection algorithm 1 selected for the data on the SRB, integrity protection algorithm 2 selected for the data on the s-DRB, integrity protection algorithm 3 selected for the data on the d-DRB, encryption algorithm 1 selected for the data on the SRB, encryption algorithm 2 selected for the data on the s-DRB, and encryption algorithm 3 selected for the data on the d-DRB are carried and ordered in sequence in the AS SMC. For optional security protection, when the optional security protection is not needed, the position for the corresponding algorithm in the AS SMC may be set to an indication for disabling the algorithm.

If different algorithms are selected for the three types of RBs, the generated keys for different types of RBs are different. However, each type of RBs may still have its own algorithm distinguisher. Table 6 describes the extension of algorithm distinguishers in this scenario.

TABLE 6

Extension of algorithm distinguishers

| Algorithm distinguisher | Value |
|---|---|
| NAS-enc-alg | 0x01 |
| NAS-int-alg | 0x02 |
| RRC-enc-alg | 0x03 |
| RRC-int-alg | 0x04 |
| UPs-enc-alg | 0x05 |
| UPs-int-alg | 0x06 |
| UPd-enc-alg | 0x07 |
| UPd-int-alg | 0x08 |

In above table 6, UPs-enc-alg represents the algorithm distinguisher for calculating the Kups_enc key, UPs-int-alg represents the algorithm distinguisher for calculating the Kups_int, UPd-enc-alg represents the algorithm distinguisher for calculating the Kupd_enc, and UPd-int-alg represents the algorithm distinguisher for calculating the Kupd_int.

Scenario 5:

In the aforementioned examples, the security protection mechanisms for the three types of RBs are based on the granularity of per type of RBs. In this scenario, the security protection mechanism is based on the granularity of per RBs. The following describes the security protection principles in this scenario.

1. Algorithm List Requirements

The security mechanisms in this scenario can flexibly control the security protection for each RB. Different RBs may have different algorithm priority requirements. In order to provide different security mechanisms for different RBs, multiple algorithm priority lists are maintained in a DeNB according to an operator's strategy.

2. Algorithm Negotiation and Indication for Activating Security

Method 1: Like in the previous scenarios, an indicator IE may be added to a radioResourceConfigDedicated IE of an RRCConnectionReconfiguration message, or to an RRCConnectionsetup message, to indicate whether to activate the security protection for an RB. The actual security algorithms for each RB are pre-configured with an AS SMC.

Method 2: Whether to activate security protection for an RB is indicated during the setup of the RB. If security protection is activated, the algorithms selected by the network side are indicated (as shown in the underlying part of the following radio resource configuration dedicated IE below):

RadioResourceConfigDedicated IE

```
-- ASN1START
RadioResourceConfigDedicated ::=    SEQUENCE {
    srb-ToAddModList        SRB-ToAddModList       OPTIONAL,     -- Cond HO-Conn
    drb-ToAddModList        DRB-ToAddModList       OPTIONAL,     -- Cond HO-toEUTRA
    drb-ToReleaseList    DRB-ToReleaseList         OPTIONAL,     -- Need ON
    mac-MainConfig                       CHOICE {
        explicitValue                    MAC-MainConfig,
        defaultValue                     NULL
            rb-int-alg                   INT-ALG-Config         OPTIONAL,      --Cond
RB-Setup
            rb-enc-alg                   ENC-ALG-Config         OPTIONAL,      --Cond
RB-Setup
    }        OPTIONAL,                                           -- Cond HO-toEUTRA2
    sps-Config              SPS-Config             OPTIONAL,     -- Need ON
    physicalConfigDedicated     PhysicalConfigDedicated     OPTIONAL,   -- Need ON
...,
```

```
    [[  rlf-TimersAndConstants-r  RLF-TimersAndConstants-r9   OPTIONAL  -- Need ON
    ]]
}
SRB ToAddModList ::=                SEQUENCE (SIZE (1..2)) OF SRB-ToAddMod
SRB-ToAddMod ::=    SEQUENCE {
    srb-Identity                    INTEGER (1..2),
    rlc-Config                      CHOICE {
        explicitValue                   RLC-Config,
        defaultValue                    NULL
    }           OPTIONAL,                                           -- Cond
Setup
    logicalChannelConfig            CHOICE {
        explicitValue                   LogicalChannelConfig,
        defaultValue                    NULL
    }           OPTIONAL,                                           -- Cond
Setup
    ...
}
DRB-ToAddModList ::=                SEQUENCE (SIZE (1..maxDRB)) OF DRB-ToAddMod
DRB-ToAddMod ::=    SEQUENCE {
    eps-BearerIdentity   INTEGER (0..15)         OPTIONAL,    -- Cond DRB-Setup
    drb-Identity         DRB-Identity,
    pdcp-Config          PDCP-Config             OPTIONAL,    -- Cond PDCP
    rlc-Config           RLC-Config              OPTIONAL,    -- Cond Setup
    logicalChannelIdentity  INTEGER (3..10)      OPTIONAL,    -- Cond DRB-Setup
    logicalChannelConfig   LogicalChannelConfig  OPTIONAL,    -- Cond Setup
...
}
DRB-ToReleaseList ::=               SEQUENCE (SIZE (1..maxDRB)) OF DRB-Identity
-- ASN1STOP
```

The two algorithm IEs, rb-int-alg and rb-enc-alg, are optional. If no algorithm is included in the message, it means by default that the corresponding security protection is not activated for the RB.

The two new algorithm IEs may be the first-level IE of the RadioResourceConfigDedicated IE. In this case, the configuration information may be used to activate the security protection and algorithm negotiation for the SRB/DRB. Alternatively, the new algorithm IEs may also be placed in RB configuration information (a second-level IE) of the RadioResourceConfigDedicated IE, and used to activate security protection and negotiate algorithms for an RB.

Method 3: A same encryption algorithm and a same integrity protection algorithm may be selected for each type of RB that needs to be protected. In this case, the legacy AS SMC does not need to be extended. Only one encryption algorithm and one integrity protection algorithm are carried in the SMC message. Whether to enable security protection may be indicated by using the radio resource configuration dedicated IE.

Each RB that uses the same algorithms may have its independent keys. In this case, the existing algorithm distinguishers need to be extended so that the algorithm distinguishers needed for calculating the keys for each RB have different values.

For those RBs that use the same algorithms, the difference between security protection requirements for the RBs that belong to a same type of RB may only be that some RBs are needed to be security protected, but other RBs are not needed.

For the same type of RBs that need to be security protected, the same security mechanism, same keys and same security algorithms, may be used to protect the data on each RB. Alternatively, the s-DRB and the SRB may also be treated in the same way, or the s-DRB and the d-DRB be treated in the same way.

Algorithms selected for each RB are independently, and each RB has its independent keys.

Figure 8:
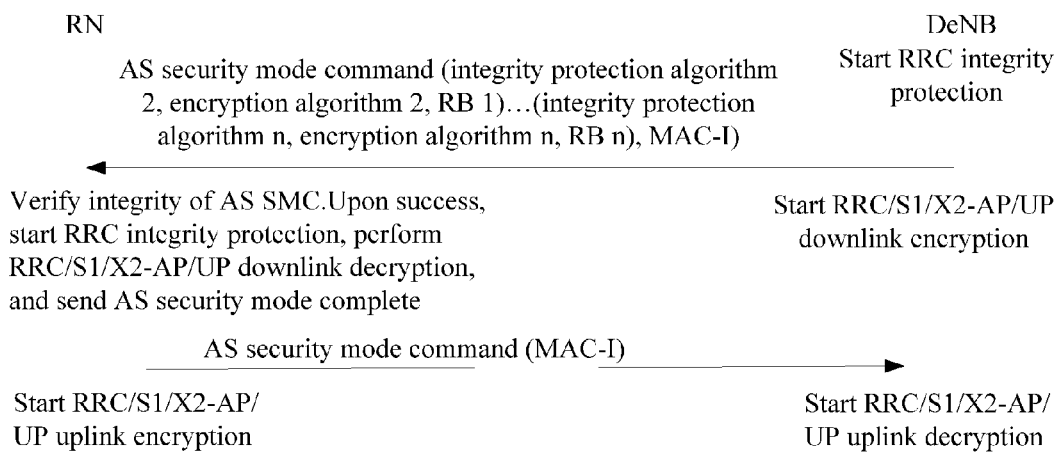
FIG. 8 is a fourth schematic diagram of algorithm negotiation by using an AS SMC according to an embodiment of the present invention.

FIG. 8 shows an algorithm negotiation between a DeNB and an RN. As the algorithms are different, the algorithm distinguishers for the keys of each RB are different. The existing algorithm distinguisher values need to be extended.

According to the methods in above embodiment, the three types of RBs on the Un interface can be protected with corresponding integrity protection algorithms and encryption algorithms. Therefore, data security protection on the Un interface is more comprehensive, and the security protection requirements for the data on different RBs can be met.

Embodiment 2

Figure 9:
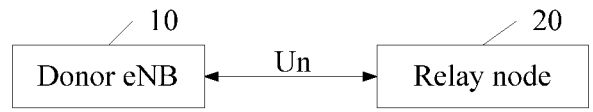
FIG. 9 is a schematic block diagram of a system according to an embodiment of the present invention.

This embodiment provides a system for protecting data on an Un interface to implement the methods for protecting data on the Un interface provided in above-described embodiment 1. FIG. 9 shows a block connection relationship of the system. As shown in FIG. 9, the system includes a donor eNB 10, and a relay node (RN) 20. Donor eNB 10 and RN 20 are connected through the Un interface.

Donor eNB 10 negotiates with RN 20 to select an integrity protection algorithm and an encryption algorithm for signaling data on the SRB, the signaling data on the s-DRB, and the user data on the d-DRB. RN 20 performs security protection for the signaling data on the SRB, the signaling data on the s-DRB, and the user data on the s-DRB with the corresponding integrity protection algorithm and encryption algorithm selected by the donor eNB.

Figure 10:
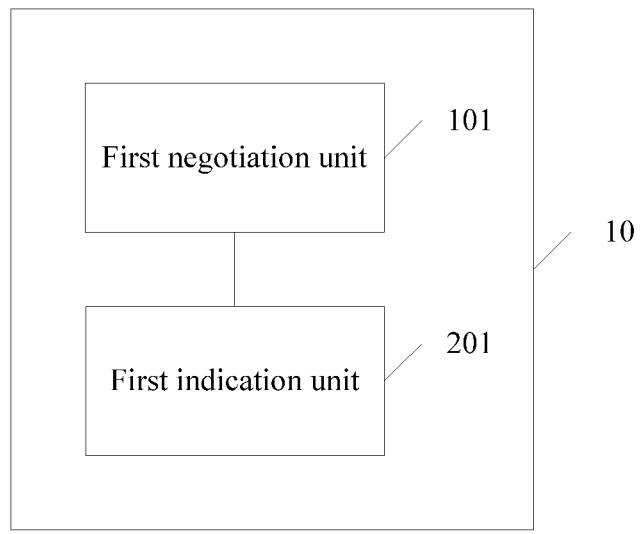
FIG. 10 is a first functional block diagram of a donor eNB 10 according to an embodiment of the present invention.

FIG. 10 is a first functional block diagram of donor eNB 10. As shown in FIG. 10, donor eNB 10 includes:

a first negotiation unit 101, configured to negotiate with the RN to select a same integrity protection algorithm and a same encryption algorithm for the signaling data on the SRB over the Un interface, the signaling data on the s-DRB over the Un interface, and the user data on the d-DRB over the Un interface. Alternatively, the donor eNB further includes a first indication unit 201, configured to indicate whether to activate the security protection for the user data on the s-DRB.

First negotiation unit 101 is specifically configured to include the selected same integrity protection algorithm and encryption algorithm into an AS SMC message.

First indication unit 201 is configured to indicate whether the security protection is activated for the user data on the d-DRB through a radio resource configuration dedicated information element, or through the AS SMC.

Figure 11:
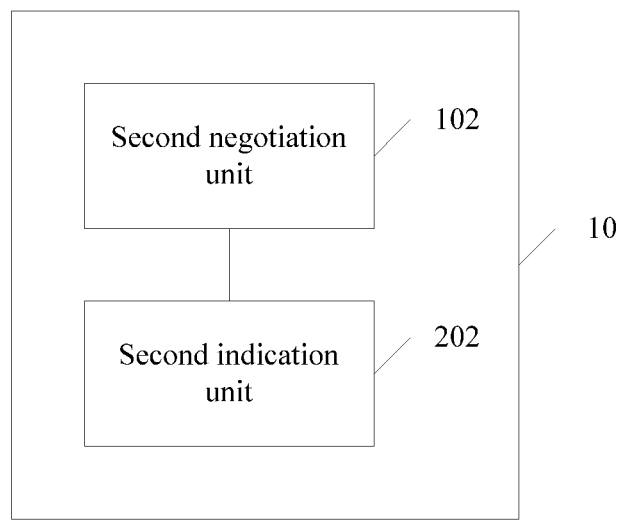
FIG. 11 is a second functional block diagram of a donor eNB 10 according to an embodiment of the present invention.

FIG. 11 shows a second functional block diagram of donor eNB 10. As shown in FIG. 11, donor eNB 10 includes a second negotiation unit 102, configured to negotiate with the RN to select a same integrity protection algorithm 1 for the data on the SRB and the s-DRB, an integrity protection algorithm 2 for the data on the d-DRB, a same encryption algorithm 1 for the data on the SRB and the d-DRB, and an encryption algorithm 2 for the data on the s-DRB. Alternatively, donor eNB 10 further includes a second indication unit 202, configured to indicate whether to activate integrity protection for the data on the d-DRB and whether to activate encryption protection for the data on the SRB and the d-DRB.

Second negotiation unit 102 is specifically configured to include in the AS SMC, the selected integrity protection algorithm 1, integrity protection algorithm 2, encryption algorithm 1, and encryption algorithm 2.

Second indication unit 202 is specifically configured to set the value of integrity protection algorithm 2 to a specific value to disable the integrity protection for the d-DRB, or set the value of encryption algorithm 1 to a specific value to disable encryption protection for the SRB and the d-DRB.

Figure 12:
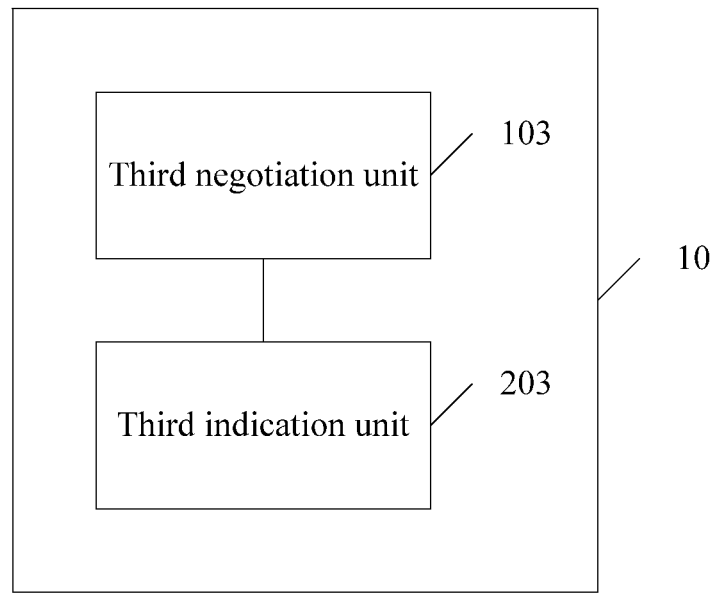
FIG. 12 is a third functional block diagram of a donor eNB 10 according to an embodiment of the present invention.

FIG. 12 is a third block diagram of donor eNB 10. As shown in FIG. 12, donor eNB 10 includes a third negotiation unit 103 and a third indication unit 203. Third negotiation unit 103 is configured to include in an AS SMC an integrity protection algorithm 1 selected for the data on the SRB and the s-DRB, an integrity protection algorithm 2 selected for the data on the d-DRB, an encryption algorithm 1 selected for the data on the d-DRB, and an encryption algorithm 2 selected for the data on the s-DRB. Third indication unit 203 is configured to carry, in a radio resource configuration dedicated information element of a message during an RB setup, the integrity protection algorithm and/or encryption algorithm selected for the data on the d-DRB. If a certain algorithm is not carried in the radio resource configuration dedicated information element, it means that the security protection corresponding to this algorithm for the d-DRB is not activated.

Figure 13:
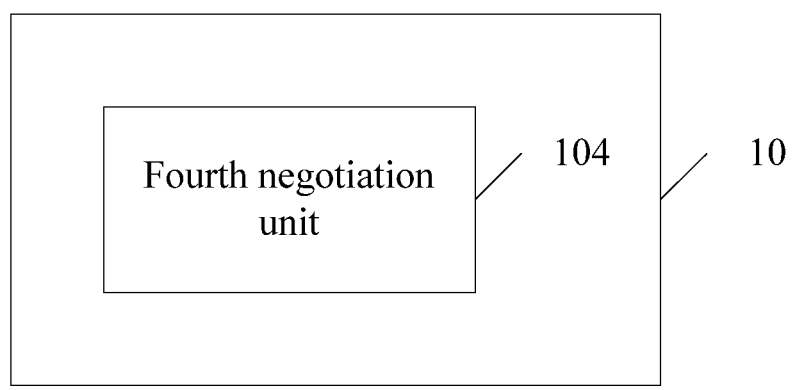
FIG. 13 is a fourth functional block diagram of a donor eNB 10 according to an embodiment of the present invention.

FIG. 13 is a fourth functional block diagram of donor eNB 10. As shown in FIG. 13, donor eNB 10 includes a fourth negotiation unit 104, configured to include in an AS SMC, an integrity protection algorithm 1 selected for the data on the SRB, an integrity protection algorithm 2 selected for the data on the s-DRB, an integrity protection algorithm 3 selected for the data on the d-DRB, an encryption algorithm 1 selected for the data on the SRB, an encryption algorithm 2 selected for the data on the s-DRB, and an encryption algorithm 3 selected for the data on the d-DRB.

Figure 14:
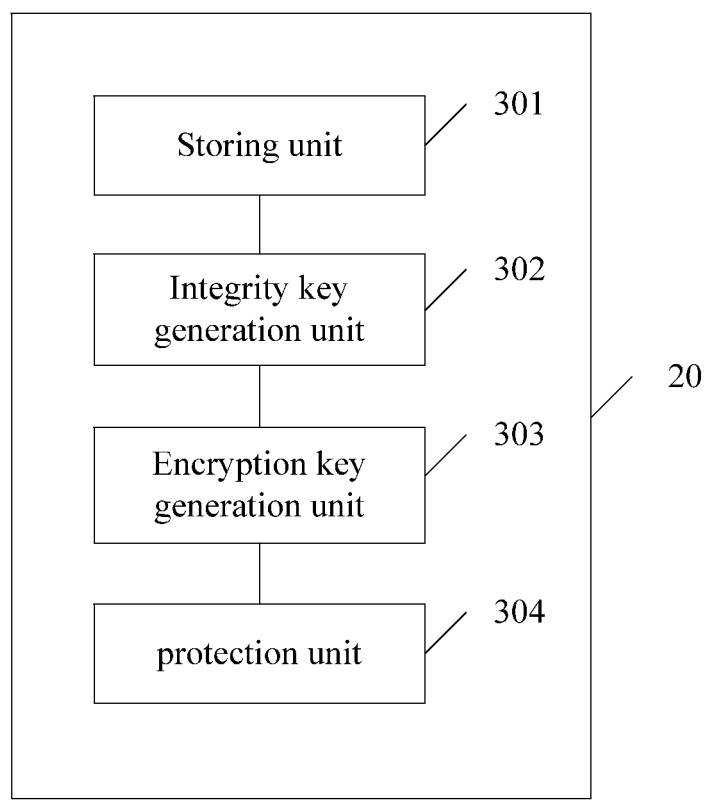
FIG. 14 is a functional block diagram of a RN according to an embodiment of the present invention.

FIG. 14 is a functional block diagram of RN 20. As shown in FIG. 14, RN 20 includes: a storing unit 301, an integrity key generation unit 302, an encryption key generation unit 303, and an encryption unit 304. Storing unit 301 is configured to pre-store integrity protection algorithm distinguishers and encryption algorithm distinguishers corresponding to the SRB, the s-DRB, and the d-DRB. Integrity key generation unit 302 is configured to generate integrity keys for the SRB, the s-DRB, and the d-DRB according to their respective integrity protection algorithm and integrity protection algorithm distinguisher. Encryption key generation unit 303 is configured to generate encryption keys for the SRB, the s-DRB, and the d-DRB according to the encryption algorithms and encryption algorithm distinguishers corresponding to the SRB, the s-DRB, and the d-DRB, respectively. Encrypting unit 304 is configured to perform security protection for the data on the SRB, the s-DRB, and the d-DRB with the respective integrity keys and the encryption keys.

Alternatively, when there is a same algorithm among the integrity protection algorithms for the SRB, the s-DRB, and the d-DRB, storing unit 301 is specifically configured to store different integrity protection algorithm distinguishers for the same integrity protection algorithm. When there is a same algorithm among the encryption algorithms for the SRB, s-DRB, and d-DRB, storing unit 301 may further configured to store different encryption algorithm distinguishers for the same encryption algorithm.

According to the above system, the data on the three types of RBs over the Un interface can be security protected with their respective integrity protection algorithm and encryption algorithm. As a result, the security protection on the Un interface is more comprehensive. In addition, the security protection requirements for data on different types of RBs can be met.

Embodiment 3

Another embodiment of the present invention provides an apparatus for protecting data on an Un interface. The apparatus includes: a negotiation unit and a protection unit. The negotiation unit is configured to select an integrity protection algorithm and an encryption algorithms for the signaling data on the SRB over the Un interface, the signaling data on the s-DRB over the Un interface, and the user data on the d-DRB over the Un interface The protection unit is configured to perform security protection for the signaling data on the SRB, the signaling data on the s-DRB, and the user data on the d-DRB with the respective integrity protection algorithms and encryption algorithms.

The protecting unit may further include a storing unit, an integrity key generation unit, and an encryption key generation unit. The storing unit is configured to pre-store integrity protection algorithm distinguishers and encryption algorithm distinguishers corresponding to the SRB, the s-DRB, and the d-DRB. The integrity key generation unit is configured to generate integrity keys for the SRB, the s-DRB, and the d-DRB according to their corresponding integrity protection algorithms and the integrity protection algorithm distinguishers. The encryption key generating unit is configured to generate encryption keys for the SRB, the s-DRB, and the d-DRB according to the encryption algorithms and the encryption algorithm distinguishers corresponding to the SRB, the s-DRB, and the d-DRB.

When there is a same algorithm among the integrity protection algorithms for the SRB, the s-DRB, and the d-DRB, the storing unit is further configured to store different integrity protection algorithm distinguishers for the same integrity protection algorithm. When there is a same algorithm among the encryption algorithms for the SRB, the s-DRB, and the d-DRB, the storing unit may further configured to store different encryption algorithm distinguishers for the same encryption algorithm.

The negotiating unit has different functions in different application scenarios:

Scenario 1:

The negotiating unit includes: a first negotiating sub-unit, configured to select a same integrity protection algorithm and a same encryption algorithm for the signaling data on the SRB over the Un interface, the signaling data on the s-DRB over the Un interface, and the user data on the d-DRB over the Un interface.

The negotiation unit may further include: a first indication sub-unit, configured to indicate whether to activate security protection for the user data on the d-DRB.

The first negotiation sub-unit is specifically configured to send an AS SMC, and include the selected same integrity protection algorithm and encryption algorithm into the AS SMC The first indication sub-unit is specifically configured to indicate whether to activate the security protection for the user data on the d-DRB with a radio resource configuration dedicated information element.

The first indication sub-unit may further configured to carry, in the AS SMC, an indication of whether to activate the security protection for the user data on the d-DRB.

Scenario 2:

The negotiation unit includes: a second negotiation sub-unit, configured to select a integrity protection algorithm 1 for the data on the SRB and the s-DRB, an integrity protection algorithm 2 for the data on the d-DRB, a encryption algorithm 1 for the data on the SRB and d the -DRB, and an encryption algorithm 2 for the data on the s-DRB on the Un interface.

The negotiating unit further includes: a second indication sub-unit, configured to indicate whether integrity protection is activated for the data on the d-DRB and whether encryption protection is activated for the data borne over the SRB and the d-DRB.

The second negotiation sub-unit is specifically configured to send an AS SMC, and include in AS SMC, the selected integrity protection algorithm 1, integrity protection algorithm 2, encryption algorithm 1, and encryption algorithm 2.

The second indication sub-unit is specifically configured to set a value of integrity protection algorithm 2 to a specific value to disable the integrity protection for the d-DRB, and set the value of encryption algorithm 1 to a specific value to disable encryption protection for the SRB and the d-DRB.

Scenario 3:

The negotiation unit includes: a third negotiation sub-unit, configured to send an AS SMC message, and carry, in the AS SMC, an integrity protection algorithm 1 selected for the data on the SRB, an integrity protection algorithm 2 selected for the data on the s-DRB, an encryption algorithm 1 selected for the data on the SRB, and an encryption algorithm 2 selected for the data on the s-DRB.

The third indication sub-unit is configured to carry, in a radio resource configuration dedicated information element of a message during an RB establishment, the integrity protection algorithm and/or encryption protection algorithm selected for the data on the d-DRB. If a certain algorithm is not carried in the radio resource configuration dedicated information element, it means that the security protection corresponding to the algorithm is not activated.

Scenario 4:

The negotiation unit includes a fourth negotiation sub-unit, configured to send an AS SMC, and carry, in the AS SMC, an integrity protection algorithm 1 selected for the data on the SRB, an integrity protection algorithm 2 selected for the data on the s-DRB, an integrity protection algorithm 3 selected for the data on the d-DRB, an encryption algorithm 1 selected for the data on the SRB, an encryption algorithm 2 selected for the data on the s-DRB, and an encryption algorithm 3 selected for the data on the d-DRB.

With the apparatus according to this embodiment, the data on the three types of RBs over the Un interface can be security protected with their corresponding integrity protection algorithms and encryption algorithms. Therefore, data security protection on the Un interface is more comprehensive. In addition, the requirements of data on different RBs for security protection can be met.

In particular, firstly, the legacy security mechanism, the three types of data on the Un interface can be flexibly protected, new security requirements with respect to the RN is meet, and the three types of data on the Un interface can be flexibly protected. Secondly, security protection for data may be controlled based on the granularity of per RB, thereby meeting security requirements for the RN more flexibly.

It should be noted for a person skilled in the art that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), or a random access memory (Random Access Memory, RAM), and so on.

It should be noted that the above embodiments of the present invention are intended for describing the technical solutions of the present invention other than limiting the present invention. Although the present invention is described in detail with reference to the foregoing embodiments, it should be understood for persons skilled in the art that other modification, equivalent replacement, or improvement may be made based on the foregoing embodiments, without departing from the spirit and scope of the present invention.

What is claimed is:

1. An evolved Node B (eNB) for a communications system, the eNB comprising:

an Un interface through which the eNB communicatively connects with a relay node, wherein radio bearers (RBs) are defined over the Un interface, the RBs including: signaling radio bearers (SRBs) for carrying control plane signaling data, signaling-data radio bearers (s-DRBs) for carrying control plane signaling data; and data-data radio bearers (d-DRBs) for carrying user plane data;

a memory configured to store integrity protection algorithms and encryption algorithms;

a processor configured to:

select, from the stored integrity protection algorithms, a first integrity protection algorithm for integrity protection of control plane signaling data on an SRB;

select, from the stored encryption algorithms, a first encryption algorithm for encryption protection of the control plane signaling data on the SRB;

select, from the stored integrity protection algorithms, a second integrity algorithm for integrity protection of control plane signaling data on an s-DRB;

select, from the stored encryption algorithms, a second encryption algorithm for encryption protection of the control plane signaling data on the s-DRB;

select, from the stored integrity protection algorithms, a third integrity protection algorithm for integrity protection of user plane data on a d-DRB;

select, from the stored encryption algorithms, a third encryption algorithm for encryption protection of the user plane data on the d-DRB; and a transmitter configured to transmit the selected first, second, and third integrity protection and encryption algorithms to the relay node.

2. The eNB of claim 1, wherein the selected first, second, and third integrity protection algorithms are the same, and the selected first, second, and third encryption algorithms are the same.

3. The eNB of claim 2, wherein:
- a first integrity protection algorithm distinguisher and a first encryption algorithm distinguisher are configured for the control plane signaling data on the SRB;
- a second integrity protection algorithm distinguisher and a second encryption algorithm distinguisher are configured for the control plane signaling data on the s-DRB; and
- a third integrity protection algorithm distinguisher and a third encryption algorithm distinguisher are configured for the user plane data on the d-DRB.

4. The eNB of claim 3, wherein the second integrity protection algorithm distinguisher is same as the third integrity protection algorithm distinguisher, and wherein the second encryption algorithm distinguisher is same as the third encryption algorithm distinguisher.

5. The eNB of claim 3, wherein the processor is further configured to:
- generate a first integrity key for integrity protection of the control plane signaling data on the SRB according to the first integrity protection algorithm and the first integrity protection algorithm distinguisher;
- generate a first encryption key for encryption protection of the control plane signaling data on the SRB according to the first encryption algorithm and the first encryption algorithm distinguisher;
- generate a second integrity key for integrity protection of the control plane signaling data on the s-DRB according to the second integrity protection algorithm and the second integrity protection algorithm distinguisher;
- generate a second encryption key for encryption protection of the control plane signaling data on the s-DRB according to the second encryption algorithm and the second encryption algorithm distinguisher;
- generate a third integrity key for integrity protection of the user plane data on the d-DRB according to the third integrity protection algorithm and the third integrity protection algorithm distinguisher; and
- generate a third encryption key for encryption protection of the user plane data on the d-DRB according to the third encryption algorithm and the third encryption algorithm distinguisher.

6. The eNB of claim 1, wherein the selected integrity protection algorithms and encryption algorithms are transmitted to the relay node through an access stratum security mode command (AS SMC).

7. The eNB of claim 1, wherein the transmitter is further configured to transmit an integrity protection indicator to the relay node, wherein the integrity protection indicator is configured to indicate whether the integrity protection is applied for the user plane data on the d-DRB.

8. The eNB of claim 7, wherein the integrity protection indicator is transmitted to the relay node through a radio resource control (RRC) message.

9. The eNB of claim 8, wherein the RRC message comprises a RRC connection reconfiguration message, the integrity protection indicator is included in the RRC connection reconfiguration message.

10. The eNB of claim 1, wherein the stored integrity protection algorithms are ordered in an integrity protection algorithm list according to priority, the stored encryption algorithms are ordered in an encryption algorithm list according to priority.

11. A method of algorithm negotiation for data protection on an Un interface between an evolved NodeB (eNB) and a relay node, wherein radio bearers (RBs) are defined over the Un interface, the RBs including: signaling radio bearers (SRBs) for carrying control plane signaling data, signaling-data radio bearers (s-DRB) for carrying control plane signaling data; and data-data radio bearers (d-DRBs for carrying user plane data, the method comprising:
- selecting, by the eNB, a first integrity protection algorithm for integrity protection of control plane signaling data on an SRB;
- selecting, by the eNB, a first encryption algorithm for encryption protection of the control plane signaling data on the SRB;
- selecting, by the eNB, a second integrity protection algorithm for integrity protection of control plane signaling data on an s-DRB;
- selecting, by the eNB, a second encryption algorithm for encryption protection of the control plane signaling data on the s-DRB;
- selecting, by the eNB, a third integrity protection algorithm for integrity protection of user plane data on a d-DRB;
- selecting, by the eNB, a third encryption algorithm for encryption protection of the user plane data on the d-DRB; and
- transmitting, by the eNB, the selected integrity protection algorithms and encryption algorithms to the relay node for security protection usage,
- wherein the first, second, and third integrity protection algorithms are selected from integrity protection algorithms stored at the eNB, the first, second, and third encryption algorithms are selected from encryption algorithms stored at the eNB.

12. The method of claim 11, wherein the selected first, second, and third protection integrity algorithms are the same, and the selected first, second, and third encryption algorithms are the same.

13. The method of claim 11, wherein,
- a first integrity protection algorithm distinguisher and a first encryption algorithm distinguisher are configured for the control plane signaling data on the SRB;
- a second integrity protection algorithm distinguisher and a second encryption algorithm distinguisher are configured for the control plane signaling data on the s-DRB; and
- a third integrity protection algorithm distinguisher and a third encryption algorithm distinguisher are configured for the user plane data on the d-DRB.

14. The method of claim 13, wherein the second integrity protection algorithm distinguisher is same as the third integrity protection algorithm distinguisher, and wherein the second encryption algorithm distinguisher is same as the third encryption algorithm distinguisher.

15. The method of claim 13, further comprising:
- generating, by the eNB, a first integrity key for integrity protection of the control plane signaling data on the SRB according to the first integrity protection algorithm and the first integrity algorithm distinguisher;
- generating, by the eNB, a first encryption key for encryption protection of the control plane signaling data on the SRB according to the first encryption algorithm and the first encryption algorithm distinguisher;
- generating, by the eNB, a second integrity key for integrity protection of the control plane signaling data on the s-DRB according to the second integrity protection algorithm and the second integrity protection algorithm distinguisher;
- generating, by the eNB, a second encryption key for encryption protection of the control plane signaling data on the s-DRB according to the second encryption algorithm and the second encryption algorithm distinguisher;

generating, by the eNB, a first integrity key for integrity protection of the user plane data on the d-DRB according to the third integrity protection algorithm and the third integrity protection algorithm distinguisher; and generating, by the eNB, a first encryption key for encryption protection of the user plane data on the d-DRB according to the third encryption algorithm and the third encryption algorithm distinguisher.

16. The method of claim 11, wherein in the transmitting step, the integrity algorithms and encryption algorithms are transmitted to the relay node through an access stratum security mode command (AS SMC).

17. The method of claim 11, further comprising:
transmitting, by the eNB, an integrity protection indicator to the relay node, wherein the protection indicator is configured to indicate whether the integrity protection is applied for the user data on the d-DRB.

18. The method of claim 17, wherein the integrity protection indicator is transmitted to the relay node through a radio resource control (RRC) message.

19. The method of claim 18, wherein the RRC message comprises a RRC connection reconfiguration message, the integrity protection indicator is included in the RRC connection reconfiguration message.

20. The method of claim 11, wherein the stored integrity protection algorithms are ordered in an integrity protection algorithm list according to priority, the stored encryption algorithms are ordered in an encryption algorithm list according to priority.

* * * * *

UNITED STATES PATENT AND TRADEMARK OFFICE
CERTIFICATE OF CORRECTION

PATENT NO. : 8,989,381 B2  
APPLICATION NO. : 13/871900  
DATED : March 24, 2015  
INVENTOR(S) : Dongmei Zhang et al.

Page 1 of 1

It is certified that error appears in the above-identified patent and that said Letters Patent is hereby corrected as shown below:

On the Title Page

Column 1, Item [63] (Related U.S. Application Data), line 2, delete "PCT/CH2012/070183" and insert -- PCT/CN2012/070183 --

Signed and Sealed this
Twenty-third Day of June, 2015

Michelle K. Lee
*Director of the United States Patent and Trademark Office*